United States Patent
Roegner

(10) Patent No.: US 8,438,159 B1
(45) Date of Patent: *May 7, 2013

(54) METHOD AND SYSTEM FOR SELECTING ADVERTISEMENTS TO BE PRESENTED TO A VIEWER

(75) Inventor: Michael W. Roegner, Plano, TX (US)

(73) Assignee: Jericho Systems, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,737

(22) Filed: Sep. 26, 2011

Related U.S. Application Data

(63) Continuation of application No. 12/855,308, filed on Aug. 12, 2010, now Pat. No. 8,060,504, which is a continuation of application No. 10/852,406, filed on May 24, 2004, now Pat. No. 7,792, 828.

(60) Provisional application No. 60/482,487, filed on Jun. 25, 2003.

(51) Int. Cl.
*G06F 17/30* (2006.01)
*G06F 3/00* (2006.01)

(52) U.S. Cl.
USPC ............. 707/728; 707/723; 707/748; 725/46

(58) Field of Classification Search ................. 707/728, 707/723, 748; 725/46
See application file for complete search history.

(56) References Cited

U.S. PATENT DOCUMENTS

| | | | |
|---|---|---|---|
| 4,698,230 A | 10/1987 | Willard | |
| 5,623,601 A | 4/1997 | Vu | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,752,238 A | 5/1998 | Dedrick | |
| 5,754,938 A | 5/1998 | Herz et al. | |
| 5,754,939 A | 5/1998 | Herz et al. | |
| 5,757,917 A | 5/1998 | Rose et al. | |
| 5,761,601 A | 6/1998 | Nemirofsky et al. | |
| 5,768,521 A | 6/1998 | Dedrick | |
| 5,774,170 A | 6/1998 | Hite et al. | |
| 5,781,894 A | 7/1998 | Petrecca et al. | |
| 5,790,426 A | 8/1998 | Robinson | |
| 5,794,210 A | 8/1998 | Goldhaber et al. | |
| 5,796,945 A | 8/1998 | Tarabella | |

(Continued)

FOREIGN PATENT DOCUMENTS

JP 2001184264 A 7/2001

OTHER PUBLICATIONS

In the U.S. Patent and Trademark Office U.S. Appl. No. 10/755,173, Final Office Action dated Apr. 18, 2008, 7 pages.

(Continued)

*Primary Examiner* — Hoang-Vu A Nguyen-Ba
(74) *Attorney, Agent, or Firm* — Patton Boggs LLP

(57) ABSTRACT

A rules evaluation engine operable to select optimal content for presentation to the viewer at each presentation opportunity. The engine evaluates segmentation rules associated with each particular content item in parallel, and then selects the best content to be presented. Priorities determined during evaluation sort out which content items will be presented. Real time dynamic enrichment of the decision making context occurs by retrieving additional information required to evaluate the rules. Logging and administrative processes for managing the segmentation rules are also realized.

24 Claims, 6 Drawing Sheets

U.S. PATENT DOCUMENTS

| | | | |
|---|---|---|---|
| 5,796,952 | A | 8/1998 | Davis et al. |
| 5,809,242 | A | 9/1998 | Shaw et al. |
| 5,838,790 | A | 11/1998 | McAuliffe et al. |
| 5,848,396 | A | 12/1998 | Gerace |
| 5,848,397 | A | 12/1998 | Marsh et al. |
| 5,855,008 | A | 12/1998 | Goldhaber et al. |
| 5,870,724 | A | 2/1999 | Lawlor et al. |
| 5,872,850 | A | 2/1999 | Klein et al. |
| 5,893,075 | A | 4/1999 | Plainfield et al. |
| 5,913,040 | A | 6/1999 | Rakavy et al. |
| 5,918,014 | A | 6/1999 | Robinson |
| 5,933,498 | A | 8/1999 | Schneck et al. |
| 5,933,811 | A | 8/1999 | Angles et al. |
| 5,937,392 | A | 8/1999 | Alberts |
| 5,946,646 | A | 8/1999 | Schena et al. |
| 5,948,061 | A | 9/1999 | Merriman et al. |
| 5,960,409 | A | 9/1999 | Wexler |
| 5,990,927 | A | 11/1999 | Hendricks et al. |
| 5,999,912 | A | 12/1999 | Wodarz et al. |
| 6,002,393 | A | 12/1999 | Hite et al. |
| 6,006,197 | A | 12/1999 | d'Eon et al. |
| 6,006,252 | A | 12/1999 | Wolfe |
| 6,016,509 | A | 1/2000 | Dedrick |
| 6,026,368 | A | 2/2000 | Brown et al. |
| 6,029,141 | A | 2/2000 | Bezos et al. |
| 6,029,195 | A | 2/2000 | Herz |
| 6,035,404 | A | 3/2000 | Zhao |
| 6,044,376 | A | 3/2000 | Kurtzman, II |
| 6,049,777 | A | 4/2000 | Sheena et al. |
| 6,061,659 | A | 5/2000 | Murray |
| 6,070,244 | A | 5/2000 | Orchier et al. |
| 6,078,866 | A | 6/2000 | Buck et al. |
| 6,088,451 | A | 7/2000 | He et al. |
| 6,119,101 | A | 9/2000 | Peckover |
| 6,144,944 | A | 11/2000 | Kurtzman, II et al. |
| 6,167,382 | A | 12/2000 | Sparks et al. |
| 6,182,050 | B1 | 1/2001 | Ballard |
| 6,185,586 | B1 | 2/2001 | Judson |
| 6,192,380 | B1 | 2/2001 | Light et al. |
| 6,223,215 | B1 | 4/2001 | Hunt et al. |
| 6,233,608 | B1 | 5/2001 | Laursen et al. |
| 6,236,971 | B1 | 5/2001 | Stefik et al. |
| 6,253,203 | B1 | 6/2001 | O'Flaherty et al. |
| 6,263,364 | B1 | 7/2001 | Najork et al. |
| 6,269,361 | B1 | 7/2001 | Davis et al. |
| 6,285,987 | B1 * | 9/2001 | Roth et al. .................. 705/14.71 |
| 6,304,967 | B1 | 10/2001 | Braddy |
| 6,308,175 | B1 | 10/2001 | Lang et al. |
| 6,332,163 | B1 | 12/2001 | Bowman-Amuah |
| 6,385,592 | B1 | 5/2002 | Angles et al. |
| 6,401,075 | B1 | 6/2002 | Mason et al. |
| 6,418,433 | B1 | 7/2002 | Chakrabarti et al. |
| 6,453,419 | B1 | 9/2002 | Flint et al. |
| 6,466,970 | B1 | 10/2002 | Lee et al. |
| 6,498,795 | B1 | 12/2002 | Zhang et al. |
| 6,505,194 | B1 | 1/2003 | Nikolovska et al. |
| 6,584,492 | B1 | 6/2003 | Cezar et al. |
| 6,615,251 | B1 | 9/2003 | Klug et al. |
| 6,647,388 | B2 | 11/2003 | Numao et al. |
| 6,665,838 | B1 | 12/2003 | Brown et al. |
| 6,718,551 | B1 | 4/2004 | Swix et al. |
| 6,721,748 | B1 | 4/2004 | Knight et al. |
| 6,757,662 | B1 | 6/2004 | Greenwald et al. |
| 6,782,369 | B1 | 8/2004 | Carrott |
| 6,804,659 | B1 | 10/2004 | Graham et al. |
| 6,892,181 | B1 | 5/2005 | Megiddo et al. |
| 6,892,354 | B1 | 5/2005 | Servan-Schreiber et al. |
| 6,978,366 | B1 | 12/2005 | Ignatchenko et al. |
| 6,983,272 | B2 * | 1/2006 | Davis et al. .................. 707/748 |
| 6,985,882 | B1 | 1/2006 | Del Sesto |
| 6,985,946 | B1 | 1/2006 | Vasandani et al. |
| 6,993,534 | B2 | 1/2006 | Denesuk et al. |
| 7,010,689 | B1 | 3/2006 | Matyas, Jr. et al. |
| 7,016,875 | B1 | 3/2006 | Steele et al. |
| 7,039,599 | B2 | 5/2006 | Merriman et al. |
| 7,039,804 | B2 | 5/2006 | Fichtner et al. |
| 7,136,853 | B1 | 11/2006 | Kohda et al. |
| 7,136,875 | B2 | 11/2006 | Anderson et al. |
| 7,139,732 | B1 | 11/2006 | Desenberg |
| 7,140,044 | B2 | 11/2006 | Redlich et al. |
| 7,146,560 | B2 | 12/2006 | Dang et al. |
| 7,162,471 | B1 | 1/2007 | Knight et al. |
| 7,185,010 | B2 | 2/2007 | Morinville |
| 7,207,067 | B2 | 4/2007 | Feng et al. |
| 7,231,358 | B2 * | 6/2007 | Singh et al. .................. 705/14.46 |
| 7,251,666 | B2 | 7/2007 | Morinville |
| 7,260,555 | B2 | 8/2007 | Rossmann et al. |
| 7,346,606 | B2 | 3/2008 | Bharat |
| 7,349,876 | B1 | 3/2008 | Veach |
| 7,434,048 | B1 | 10/2008 | Shapiro et al. |
| 7,478,418 | B2 | 1/2009 | Supramaniam et al. |
| 7,496,943 | B1 | 2/2009 | Goldberg et al. |
| 7,499,874 | B2 | 3/2009 | Singh et al. |
| 7,512,976 | B2 | 3/2009 | Burrows |
| 7,565,683 | B1 | 7/2009 | Huang et al. |
| 7,647,299 | B2 | 1/2010 | Harik |
| 7,668,832 | B2 | 2/2010 | Yeh et al. |
| 7,693,827 | B2 | 4/2010 | Zamir et al. |
| 7,697,791 | B1 | 4/2010 | Chan et al. |
| 7,698,266 | B1 | 4/2010 | Weissman et al. |
| 7,707,053 | B2 | 4/2010 | Veach |
| 7,716,161 | B2 | 5/2010 | Dean et al. |
| 7,734,624 | B2 | 6/2010 | Anderson et al. |
| 7,778,872 | B2 | 8/2010 | Kamangar et al. |
| 7,779,247 | B2 | 8/2010 | Roegner |
| 7,783,765 | B2 | 8/2010 | Hildebrand et al. |
| 7,792,698 | B1 | 9/2010 | Veach et al. |
| 7,792,828 | B2 | 9/2010 | Roegner |
| 7,813,966 | B2 * | 10/2010 | Alaia et al. .................. 705/26.1 |
| 7,818,207 | B1 | 10/2010 | Veach |
| 7,827,062 | B2 | 11/2010 | Merriman et al. |
| 7,831,693 | B2 | 11/2010 | Lai |
| 7,844,488 | B2 | 11/2010 | Merriman et al. |
| 7,844,493 | B1 | 11/2010 | Veach et al. |
| 7,865,931 | B1 | 1/2011 | Stone et al. |
| 7,873,536 | B2 | 1/2011 | Desikan et al. |
| 2001/0037205 | A1 | 11/2001 | Joao |
| 2001/0056374 | A1 | 12/2001 | Joao |
| 2002/0002684 | A1 | 1/2002 | Fox et al. |
| 2002/0013785 | A1 | 1/2002 | Miyazaki et al. |
| 2002/0019831 | A1 | 2/2002 | Wade |
| 2002/0032740 | A1 | 3/2002 | Stern et al. |
| 2002/0046118 | A1 | 4/2002 | Minte |
| 2002/0052928 | A1 | 5/2002 | Stern et al. |
| 2002/0066042 | A1 | 5/2002 | Matsumoto et al. |
| 2002/0082923 | A1 | 6/2002 | Merriman et al. |
| 2002/0099600 | A1 | 7/2002 | Merriman et al. |
| 2002/0103698 | A1 | 8/2002 | Cantrell |
| 2002/0112035 | A1 | 8/2002 | Carey et al. |
| 2002/0112155 | A1 | 8/2002 | Martherus et al. |
| 2002/0120507 | A1 | 8/2002 | Chanos et al. |
| 2002/0156779 | A1 | 10/2002 | Elliott et al. |
| 2003/0023489 | A1 | 1/2003 | McGuire et al. |
| 2003/0120601 | A1 | 6/2003 | Ouye et al. |
| 2003/0154406 | A1 | 8/2003 | Honarvar et al. |
| 2003/0167298 | A1 | 9/2003 | Bazinet et al. |
| 2004/0268388 | A1 | 12/2004 | Roegner |
| 2005/0086244 | A1 | 4/2005 | Morinville |
| 2005/0097188 | A1 | 5/2005 | Fish |
| 2010/0312741 | A1 | 12/2010 | Roegner |

OTHER PUBLICATIONS

In the U.S. Patent and Trademark Office U.S. Appl. No. 10/755,173, Interview Summary dated Jul. 25, 2008, 4 pages.
In the U.S. Patent and Trademark Office U.S. Appl. No. 10/755,173, Non-Final Office Action dated Apr. 30, 2007, 12 pages.
In the U.S. Patent and Trademark Office U.S. Appl. No. 10/755,173, Non-Final Office Action dated Oct. 2, 2008. 9 pages.
In the U.S. Patent and Trademark Office U.S. Appl. No. 10/852,406, Notice of Allowance dated May 6, 2010, 6 pages.
In the U.S. Patent and Trademark Office U.S. Appl. No. 12/658,421, Non-Final Office Action dated Jan. 20, 2011, 14 pages.
In the U.S. Patent and Trademark Office U.S. Appl. No. 12/855,308 Non-Final Office Action dated Jan. 12, 2011, 11 pages.
In the U.S. Patent and Trademark Office U.S. Appl. No. 10/755,173, Notice of Allowance dated Dec. 17, 2009, 6 pages.

In the U.S. Patent and Trademark Office U.S. Appl. No. 10/755,173, Notice of Allowance dated Jun. 26, 2009, 7 pages.
In the U.S. Patent and Trademark Office U.S. Appl. No. 10/755,173, Notice of Allowance dated Mar. 6, 2009, 4 pages.
In the U.S. Patent and Trademark Office U.S. Appl. No. 10/852,406, Final Office Action dated Aug. 13, 2008, 13 pages.
In the U.S. Patent and Trademark Office U.S. Appl. No. 10/852,406, Non-Final Office Action dated Dec. 23, 2011, 9 pages.
In the U.S. Patent and Trademark Office U.S. Appl. No. 10/852,406, Non-Final Office Action dated Nov. 21, 2011, 16 pages.
In the U.S. Patent and Trademark Office U.S. Appl. No. 10/852,406, Office Action dated Mar. 24, 2009, 13 pages.
"eXtensible Access Control Markup Language (XACML) Version 1.0," OASIS Standard, Feb. 18, 2003; 132 pages.
"OASIS eXtensible Access Control Markup Language (XACML)," Committee Specification 1.0, Nov. 7, 2002, 129 pages.
Adams et al., Oasis XACML Technical Committee Meeting, [online], Apr. 22, 2002, Retrieved from the Internet: <URL: http://lists.oasis-open.org/archives/xacml/200205/doc00000.doc>, pp. 1-12.
Adams, "XACML 1.0 Approved as a Committee Specification," Nov. 8, 2002, 2 pages.
Adams, [xacml] Major milestone achived, and next step . . . , [online], Mar. 28, 2002. Message posted to xacml@lists.oasis-open.org, archived at and retrieved from the Internet: <URL: http://lists.oasis-open.org/archives/xacml/200203/msg00112.html>, pp. 1-2.
Anderson, [xacml] Commit to implement XACML?, [online], Jun. 25, 2002. Message posted to xacml@lists.oasis-open.org, archived at and retrieved from the Internet: <URL: http://lists.oasis-open.org/archives/xacml/200206/msg00090.html>, pp. 1-2.
Anderson, [xacml] Examples of J2SE Policy via XACML, [online], Apr. 19, 2002. Message posted to xacml@lists.oasis-open.org, archived at and retrieved from the Internet: <URL: http://lists.oasis-open.org/archives/xacml/200204/msg00130.html>, pp. 1-7.
Anderson, [xacml] RE: Conformance Tests, [online], Sep. 5, 2002. Forwarded message from John Howard. Message posted to xacml@lists.oasis-open.org, archived at and retrieved from the Internet: <URL: http://lists.oasis-open.org/archives/xacml/200209/msg00027.html>, pp. 1-3.
Anderson, FW: ContentGuard IPR Declaration for OASIS re: XACML, [online], Nov. 26, 2002. Message posted to xacml@lists.oasis-open.org, archived at and retrieved from the Internet: <URL: http://lists.oasis-open.org/archives/xacml/200211/msg00189.html>, pp. 1-2.
Barroso et al., "Web sarch for a planet: The Google Cluster Architecture," [online], IEEE Micro, Mar.-Apr. 2003; 23(2):22-28, Retrieved from the Internet: <URL: http://static.googleusercontent.com/external content/untrusted dlcp/labs.google.com/en/us/papers/googlecluster-ieee.pdf>.
Best, [xacml] Re: XACML 1.0 approved as a Committee Specification!, [online], Nov. 8, 2002. Message posted to xacml@lists.oasis-open.org, archived at and retrieved from the Internet: <URL: http://lists.oasis-open.org/archives/xacml/200211/msg00118.html>, pp. 1-3.
Erickson, Re: [xacml] Fundamental concepts in XACML, [online], Jun. 17, 2002. Message posted to xacml@lists.oasis-open.org, archived at and retrieved from the Internet: <URL: http://lists.oasis-open.org/archives/xacml/200206/msg00052.html>, pp. 1-3.
Ghemawat et al., "The Google File System," in Proc. 19th ACM GSymp. On Operating Syst. Principles, Oct. 19-22, 2003, Retrieved from the Internet: <URL: http://static.googleusercontent.com/external content/untrusted dlcp/research.google.com/en/us/archive/gfs-sosp2003.pdf>, pp. 29-43.
Kudoh, [use case] revised document, [online], Sep. 4, 2001, Message posted to xacml@lists.oasis-open.org, archived at and retrieved from the Internet: <URL: http://lists.oasis-open.org/archives/xacml/200109/msg00003.html>, pp. 1-2.
Kudoh, [xacml] US Patent Application, [online], May 3, 2002. Message posted to xacml@lists.oasis-open.org, archived at and retrieved from the Internet: <URL: http://lists.oasis-open.org/archives/xacml/200205/msg00006.html>, pp. 1-2.

Kudoh, F2F 2 meeting slides Use Case and Requirement, [online], Sep. 10, 2011, Retrieved from the Internet: <URL: http://lists.oasis-open.org/archives/xacml/200109/bin00006.bin>, pp. 1-8.
Kudoh, Slides used in F2F#2, [online], Sep. 11, 2001, Message posted to xacml@lists.oasis-open.org, archived at and retrieved from the Internet: <URL: http://lists.oasis-open.org/archives/xacml/200109/msg00055.html>.
Lockhart, (Powerpoint Slides presented Dec. 11, 2002) eXtensible Access Control Markup Language (XACML), pp. 1-21.
Lockhart, [xacml] Champions Missing from F2F, [online], Mar. 7, 2002. Message posted to xacml@lists.oasis-open.org, archived at and retrieved from the Internet: <URL: http://lists.oasis-open.org/archives/xacmll/200203/msg00014.html>, p. 1.
Lockhart, [xacml] Slides Presented to PRISM, [online], Jan. 9, 2003. Message posted to xacml@lists.oasis-open.org, archived at and retrieved from the Internet: <URL: http://lists.oasis-open.org/archives/xacmll/200301/msg00005.html>, pp. 1.
Maclean, [xacml] RE: [xacml] XrML & XACML Review, [online], Apr. 1, 2002. Message posted to xacml@lists.oasis-open.org, archived at and retrieved from the Internet: <URL: http://lists.oasis-open.org/archives/xacml/200204/msg00000.html>, pp. 1-2.
Marquard, "ASP.NET Performance Monitoring, and When to Alert Administrators," *ASP.NET Technical Articles*, Microsoft Corp., Updated Jul. 2003, 17 pages.
Moses et al., draft-xacml-v0.10, [online], Mar. 8, 2002, Retrieved from the Internet: <URL: http://lists.oasis-open.org/archives/xacml/200203/doc00000.doc>, pp. 1-35.
Moses et al., draft-xacml-v0.11, [online], Mar. 19, 2002, Retrieved from the Internet: <URL: http://lists.oasis-open.org/archives/xacml/200203/doc00002.doc>, pp. 1-41.
Moses et al., draft-xacml-v0.12, [online], Apr. 2, 2002, Retrieved from the Internet: <URL: http://lists.oasis-open.org/archives/xacml/200204/doc00001.doc>, pp. 1-44.
Moses et al., draft-xacml-v0.14, [online], Jun. 14, 2002, Retrieved from the Internet: <URL: http://lists.oasis-open.org/archives/xacm1/200206/doc00000.doc>, pp. 1-57.
Moses et al., draft-xacml-v0.15, [online], Jul. 12, 2002, Retrieved from the Internet: <URL: http://lists.oasis-open.org/archives/xacml/200207/doc00003.doc>, pp. 1-56.
Moses et al., draft-xacml-v0.16, [online], Aug. 22, 2002, Retrieved from the Internet: <URL: http://lists.oasis-open.org/archives/xacml/200208/doc00009.doc>, pp. 1-86.
Moses et al., draft-xacml-v0.9, [online], Feb. 14, 2002, Retrieved from the Internet: <URL: http://lists.oasis-open.org/archives/xacml/200202/doc00002.doc>, pp. 1-32.
Moses et al., draft-xacml-v12, [online], Sep. 27, 2002, Retrieved from the Internet: <URL: http://lists.oasis-open.org/archives/xacml/200209/doc00002.doc>, pp. 1-113.
Moses et al., OASIS eXtensible Access Control Markup Language (XACML) Committee Specification 1.0 (Revision 1), [online], Dec. 12, 2002. Retrieved from the Internet: <URL: http://lists.oasis-open.org/archives/xacml/200212/doc00001.doc>, pp. 1-129.
Moses et al., OASIS eXtensible Access Control Markup Language (XACML) Committee Specification 1.0, [online], Oct. 25, 2002. Retrieved from the Internet: <URL: http://lists.oasis-open.org/archives/xacml/200210/doc00004.doc>, pp. 1-121.
Moses et al., OASIS eXtensible Access Control Markup Language (XACML) Committee Specification 1.0, [online], Oct. 8, 2002. Retrieved from the Internet: <URL: http://lists.oasis-open.org/archives/xacml/200210/doc00000.doc>, pp. 1-117.
Moses et al., XACML langugage proposal V.0.4, [online], Nov. 5, 2001, Retrieved from the Internet: <URL: http://lists.oasis-open.org/archives/xacml/200111/doc00002.doc>, pp. 1-13.
Moses et al., XACML langugage proposal V.0.6, [online], Nov. 23, 2001, Retrieved from the Internet: <URL: http://lists.oasis-open.org/archives/xacml/200111/doc00005.doc>, pp. 1-23.
Moses et al., XACML langugage proposal V.0.7, [online], Nov. 27, 2001, Retrieved from the Internet: <URL: http://lists.oasis-open.org/archives/xacml/200111/doc00006.doc>, pp. 1-30.
Moses et al., XACML langugage proposal V.0.8, [online], Jan. 10, 2002, Retrieved from the Internet: <URL: http://lists.oasis-open.org/archives/xacml/200201/doc00000.doc>, pp. 1-35.

Moses, Clinical Record Use Cases, [online], Sep. 4, 2001, [retrieved on Sep. 9, 2001], Retrieved from the Internet: <URL: http://lists.oasis-open.org/archives/xacml/200109/pdf00001.pdf>, pp. 1-45.

Netz et al., "Integrating Data Mining with SQL Databases: OLE DB for Data Mining," *IEEE*, 2001.

Oasis, eXtensible Access Control Markup Language TC, Face to Face Meeting #1 of the XACML TC Agenda, [online], Updated Jul. 17, 2001, Retrieved from the Internet: <URL: http://www.oasis-open.org/committees/xacml/agendas/20010718-f2f1.shtml>, pp. 1-3.

Oasis, eXtensible Access Control Markup Language TC, Face to Face Meeting #2 Agenda, [online], to be delivered Sep. 10, 2001, Retrieved from the Internet: <URL: http://www.oasis-open.org/committees/xacml/agendas/20010910-f2f2.shtml#minutes>, pp. 1-3.

Pilz, Domain model, Draft-xtc-use-domain-02, [online], Jun. 12, 2001, Retrieved from the Internet: <URL: http://lists.oasis-open.org/archives/xacml/200107/doc00000.doc>, pp. 1-5.

Pilz, XACML Draft-xtc-use-domain-01, [online], Jun. 7, 2001, Retrieved from the Internet: <URL: http://lists.oasis-open.org/archives/xacml/200106/doc00000.doc>, pp. 1-3.

Thorpe, "Business Rule Exchange—the Next XML Wave," May 21-25, 2001, XML Europe 2001 Internationales Congress Centrum (ICC) Berlin, Germany.

Yagen, [xacml] XACML Feb. 21, 2002 Minutes, [online], Sep. 4, 2001, Message posted to xacml@lists.oasis-open.org, archived at and retrieved from the Internet: <URL: http://lists.oasis-open.org/archives/xacml/200202/msg00124.html>, pp. 1-5.

Yagen, FTF#1 Jul. 18, 2001 Minutes, [online], Jul. 23, 2001, Message posted to xacml@lists.oasis-open.org, archived at and retrieved from the Internet: <URL: http://lists.oasis-open.org/archives/xacml/200107/msg00033.html>, pp. 1-11.

* cited by examiner

Dynamic Enrichment Process

METHOD AND SYSTEM FOR SELECTING ADVERTISEMENTS TO BE PRESENTED TO A VIEWER

RELATED APPLICATIONS

This application is a continuation of U.S. patent application Ser. No. 12/855,308 filed Aug. 12, 2010, which is a continuation of U.S. patent application Ser. No. 10/852,406 filed on May 24, 2004, which is incorporated herein by reference in its entirety and claims the benefit of priority to U.S. Provisional Patent Application No. 60/482,487 filed on Jun. 25, 2003, which is incorporated herein by reference in its entirety. This application is related to and incorporates by reference U.S. Provisional Patent Application No. 60/438,972 filed Jan. 9, 2003 entitled, "Method and System for Dynamically Implementing an Enterprise Resource Policy", and U.S. patent application Ser. No. 10/755,173 filed Jan. 9, 2004 entitled, "System and Method for Dynamically Implementing an Enterprise Resource Policy."

TECHNICAL FIELD OF THE INVENTION

The invention relates to a system operable to select optimal content to be presented to a viewer, based upon both the characteristics of the viewer and the viewing situation.

BACKGROUND OF THE INVENTION

Over the last decade, technology has drastically improved the effectiveness of technology-based marketing. CRM systems have brought businesses back to their ancestral roots by providing organizations with a collective memory of every customer and their interactions. Previously, this was cost-prohibitive.

However, providing the optimal message to a customer is still a very cumbersome and time-consuming process. As a result, corporations have not fully benefited from the promise of real-time customized and personalized marketing. Many customized content and personalization initiatives remain undeveloped because of their prohibitive human and financial costs of implementation.

With the traditional targeted marketing paradigm, the seller initiates an interaction with the customer by analyzing historical data to segment customers offline and then "pushes" a message out to the customer. The seller then hopes for a response. However, other more proactive methods are desired.

SUMMARY OF THE INVENTION

The present invention provides a system and method to select, from a predefined palette of content items, those items which are best suited for an individual. This selection is based both on the attributes of the viewer and the context in which the contents is viewed. (i.e., at that precise moment in time). The content may involve advertisements, articles, or multimedia, such as animated images, movies, or audio clips.

More specifically, the present invention provides a centralized system that defines and manages business rules to identify what content is most relevant to the individual viewer's context. Then upon receipt of the content selection request, a centralized system evaluates the viewer's characteristics, the situational characteristics (context), and the viewer's personal history against the coded rules in order to select an optimal content set for display. Then the selected content is returned to a local system that serves the selected content to the viewer. Essentially, a number of diverse content items can be managed by the system, wherein each content item may have one or more coded rules which define the viewer and content in which content would be presented to the viewer.

In effect, each item of content has a rule which describes a "profile" of what an ideal viewer or presentation opportunity. When the content selection request is made, the coded rules associated with each relevant item are evaluated to determine if an appropriate viewing opportunity exists. If the rule is satisfied, the system then adds the content item, within a prioritized queue, to an aggregated body of content items for this presentation opportunity. The items are then sorted, by descending priority, with the most significant items being returned for presentation. The prioritized list is returned based on the results of evaluating the individual content items against various business rules. This produces a prioritized list of items most suitable for presentation to the viewer in the viewer's current viewing context.

Several advantages are provided. First, the ability to perform the evaluation process in real time, at the moment of the request is a significant advantage over existing systems. This allows the content selected to be sensitive to the current presentation opportunity rather than the data warehouse intensive traditional model which selects content days, and even weeks, beforehand. The present invention may also couple to enterprise data sources, customer care systems, and external data sources such as credit scoring bureaus, etc. to provide a very rich palette of information on which to base the content selection rules.

A detailed log of each request made, along with any/all content items selected for presentation, provides for auditability and effectiveness metrics, as well as inputs for a "feedback loop" in which future presentation opportunities can be made based on prior decisions. For example, a rule could be constructed such that an individual item of content would be highly prioritized under default conditions, but would be deprioritized in favor of other content items after the original item had been presented to a viewer. One implementation may reduce an item's priority after the item has been viewed three times in a 24-hour period.

An advantage of the present invention is that the rules defining the optimal presentation opportunity do not need to be maintained in executable code by the administrator or user. The rules are captured in a representative notational format via a rule-builder GUI application, and then stored in an XML encoded structure within repository. As they are not a part of the presentation engine (such as a web server), they can be changed at will without the need to update or test the web server or HTML source for the web pages the content is to be presented in. The items of content are managed in a hierarchical model, with each item inheriting characteristics from its parent to determine who may manipulate or change the rules which determine the rule's behavior unless a specific rule is established for the individual item. Ultimately, this allows the rules to be administered in a distributed fashion throughout an enterprise, or even to clients (usually advertisers) and business partners if the situation warrants such.

The invention can be invoked via a number of methods, including a J2EE compliant API library, a procedural interface suitable for linking into legacy applications written in C, COBOL, FORTRAN, etc., a Web Services interface, a C+ interface, or even a custom-developed API for an individual customer's needs.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
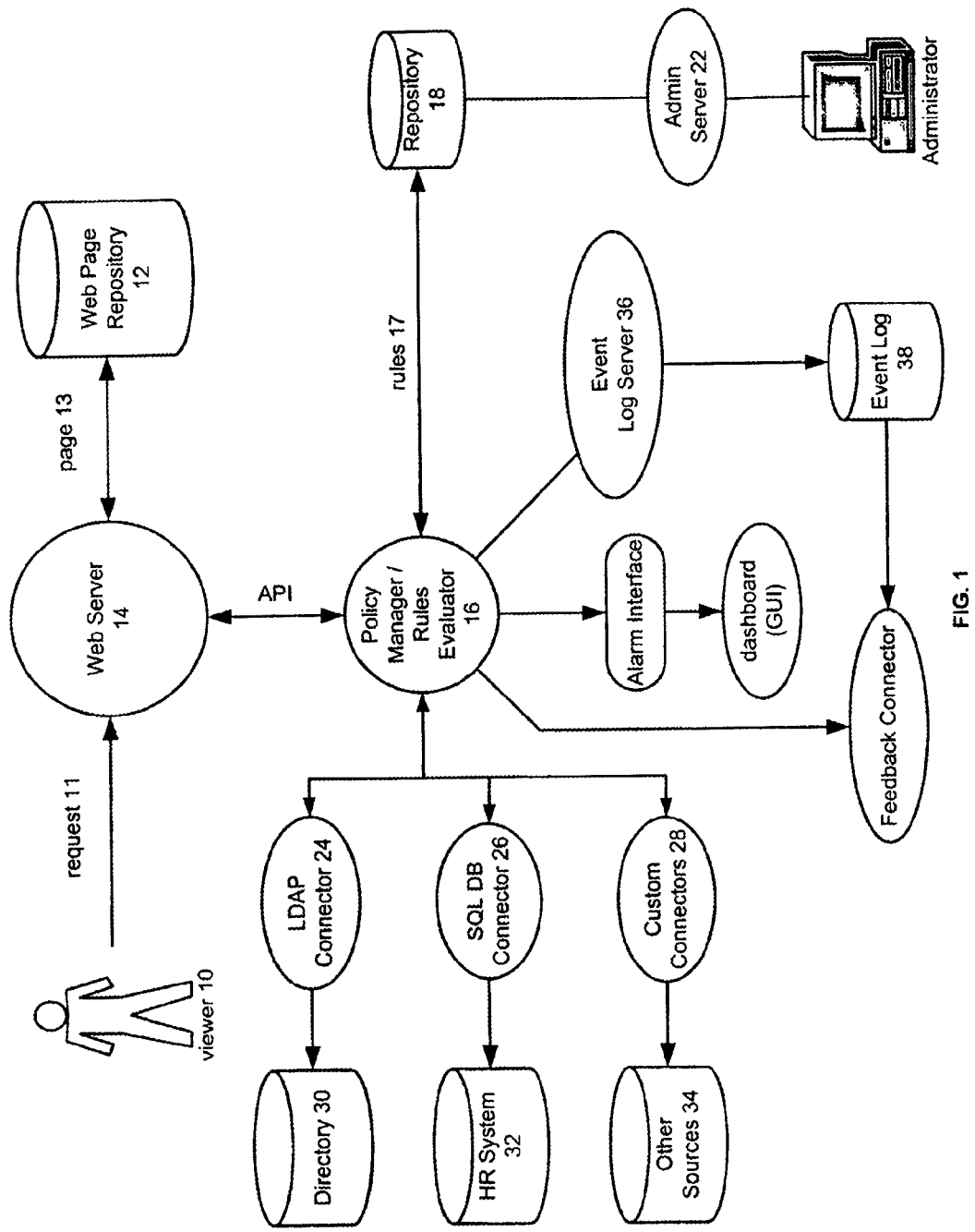
FIG. 1 depicts one basic implementation model to provide optimal content item for a particular viewer of a website.

One potential architecture for the use with the invention is depicted in FIG. 1. Here, user or viewer 10 requests a page of content from web server 14. Viewer 10 may have previously established his identity by authenticating in some fashion with web server 14. Alternatively, viewer 10 may be treated as having a default or anonymous identity.

Web server 14 loads page 13 from web page repository 12. Then web server 14 executes java servlets or other like instructions that are contained within page 13. The servlets invoke services application programming interface (API) which places a remote procedure call (RPC) into policy manager 16. This RPC requests content specifically chosen for viewer 10. Request 11 contains both the identity of viewer 10 and information that defines the set of rules and content items to be selected from a campaign or set of related content items.

Policy manager 16 uses a name associated with the campaign or set of related content item to retrieve a set of rules 17 from rules repository 18. Policy manager 16 then examines rules 17 to determine what additional information or data elements are required to evaluate rules 17.

Policy manager 16 invokes any/all connectors required, including but not limited to LDAP connector 24, SQL DB connector 26 and custom connector 28 to retrieve the information or data elements required to evaluate rules 17. These data elements may be within directory database 30, HR system database 32 and other data sources 34. These data sources return the data elements needed to policy manager 16.

Policy manager 16 enriches the decision context with the information retrieved. Policy manager 16 then evaluates the rules and creates an aggregated list of the content items associated with any/all rules whose criteria are met. Policy manager 16 then sorts the aggregated list in order of descending priority. The top "n" items of content ("n" being a number of items parameter passed on the ESAPI request), are selected and returned to web server 14 as the resultant of the ESAPI request. The web server then inserts those return content items into page 13, which may take the form of an HTML document. The customized page is then presented to viewer 10 via a web browser or other like application.

Event log 36 may track every transaction created and stored within repository 38. The information within event log 36 can provide the basis of metrics determining system usage and effectiveness as well as providing the inputs and capability on which to modify rules 17. For example, upon such information may include how many times a particular item has been presented to a specific viewer in a defined time interval.

Figure 2:
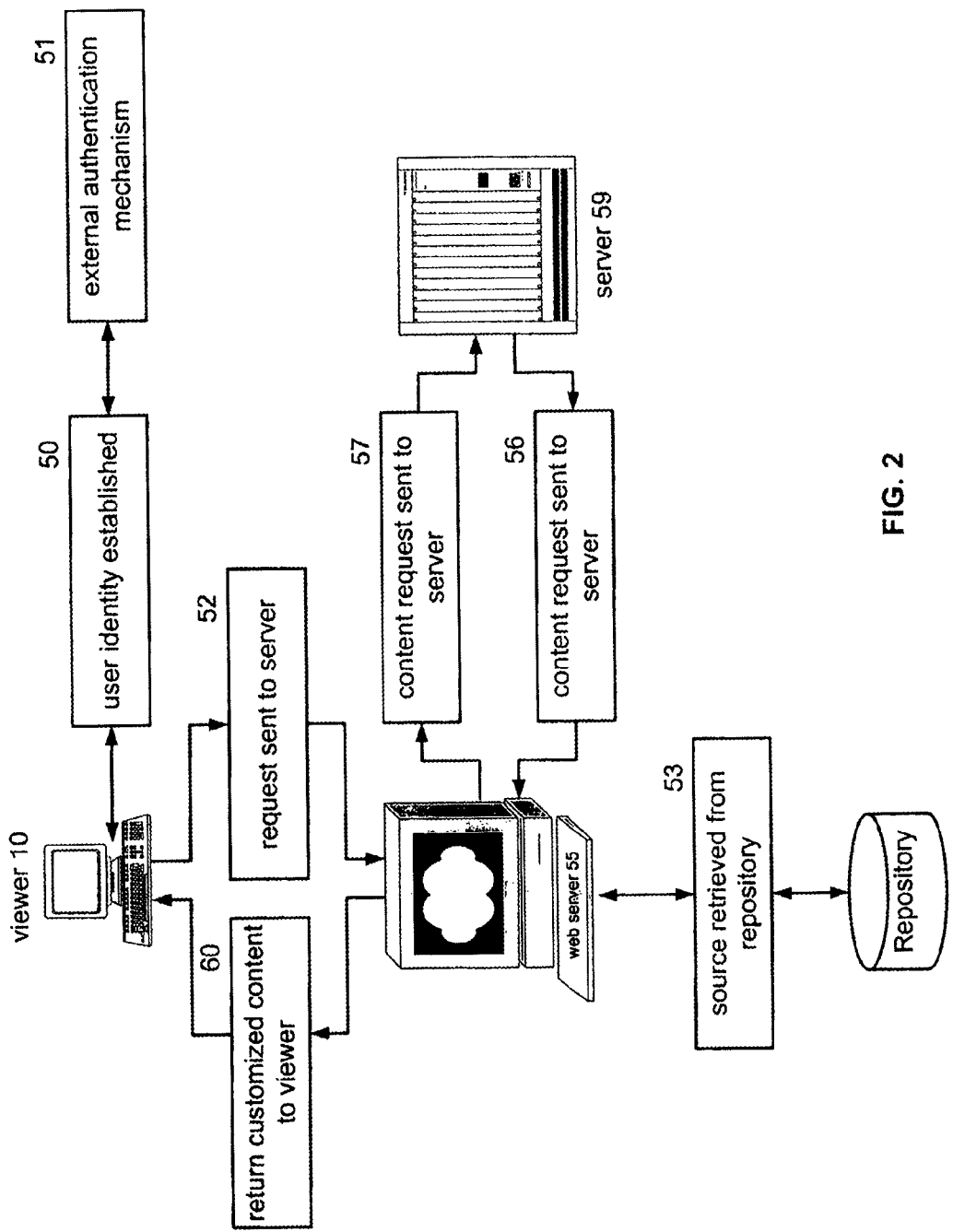
FIG. 2 provides a logical flow diagram relating to processing a content selection request.

FIG. 2 provides a process flow diagram that depicts the logical flow of web content request. The processing of a request to select content items for a viewer. In step 50, viewer 10 establishes their identity by authentication through a means such as external authentication mechanism 51. Next, a request is sent to web server 55 for a document in step 52.

In step 53, the document source is retrieved from the source repository, whereupon the web server executes instructions embedded within the document. Those instructions then invoke a services API in step 57 to request content from server 59. Optimal content is returned to web server 59 in step 56. Instructions within the document are then replaced with content. Then in step 60, web server 55 delivers the customized page to the user's browser for display.

Figure 3:
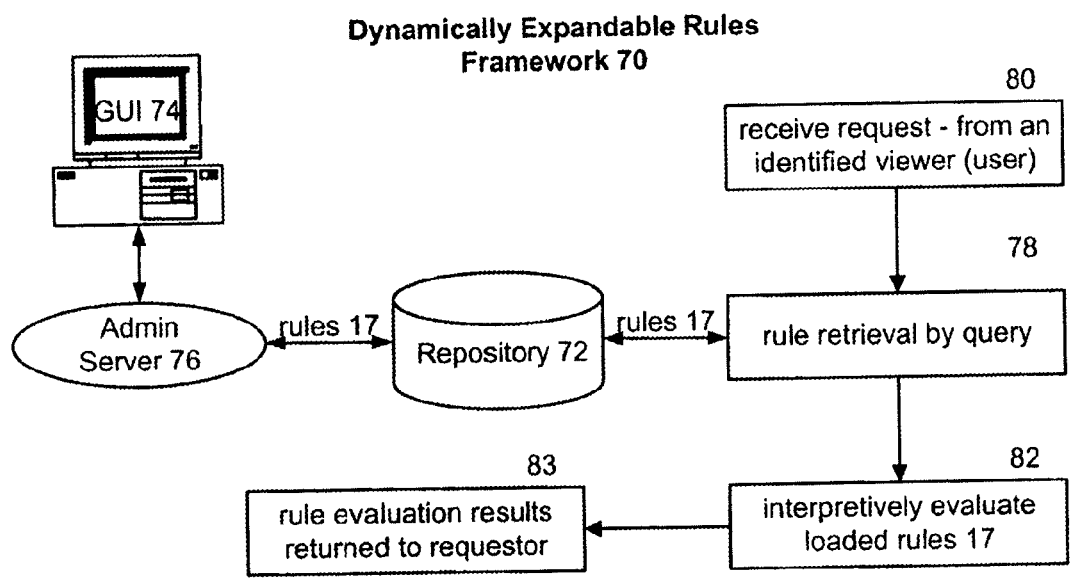
FIG. 3 is a diagram of the Dynamically Expandable Rules Framework that describes a process, implemented in code, by which invocation of a service can be made both enabled for parallel scaling and tolerant of failure of components in accordance with the present invention.

FIG. 3 depicts dynamically extensible rules management and evaluation framework 70. Rules evaluation engine is based upon the concept of using a process by which a policy is expressed as a rule, encoded in a machine-independent rules modeling language. The rule can be dynamically loaded from the repository 72 and evaluated upon demand within multiple execution contexts simultaneously. This provides for parallel scaling and fault tolerant capabilities. As the rules are loaded dynamically at evaluation time, rules may be created and/or changed at will, and will take effect upon the next evaluation request.

In FIG. 3, GUI 74 allows administrative users to access rules 17 stored within repository 72. GUI 74 also facilitates the ability of administrative users to create and modify coded rules based on business rules. GUI 74 interacts with repository 72 through server 76. The coded rules corresponding to the business rules are stored within repository 72. These rules 17 determine what content will be eligible to be presented to a viewer as previously described in FIGS. 1 and 2.

Rules 17 are retrieved from repository 72 following receipt of a content selection request that corresponds to query 78 that is received via web server 14 via input from user 10 through web server 14. Rules 17 are dynamically loaded and interpretively evaluated within process 82 wherein the results of this evaluation are returned to web server 14 or other requesting application in order to present the optimum content to a viewer.

Figure 4:
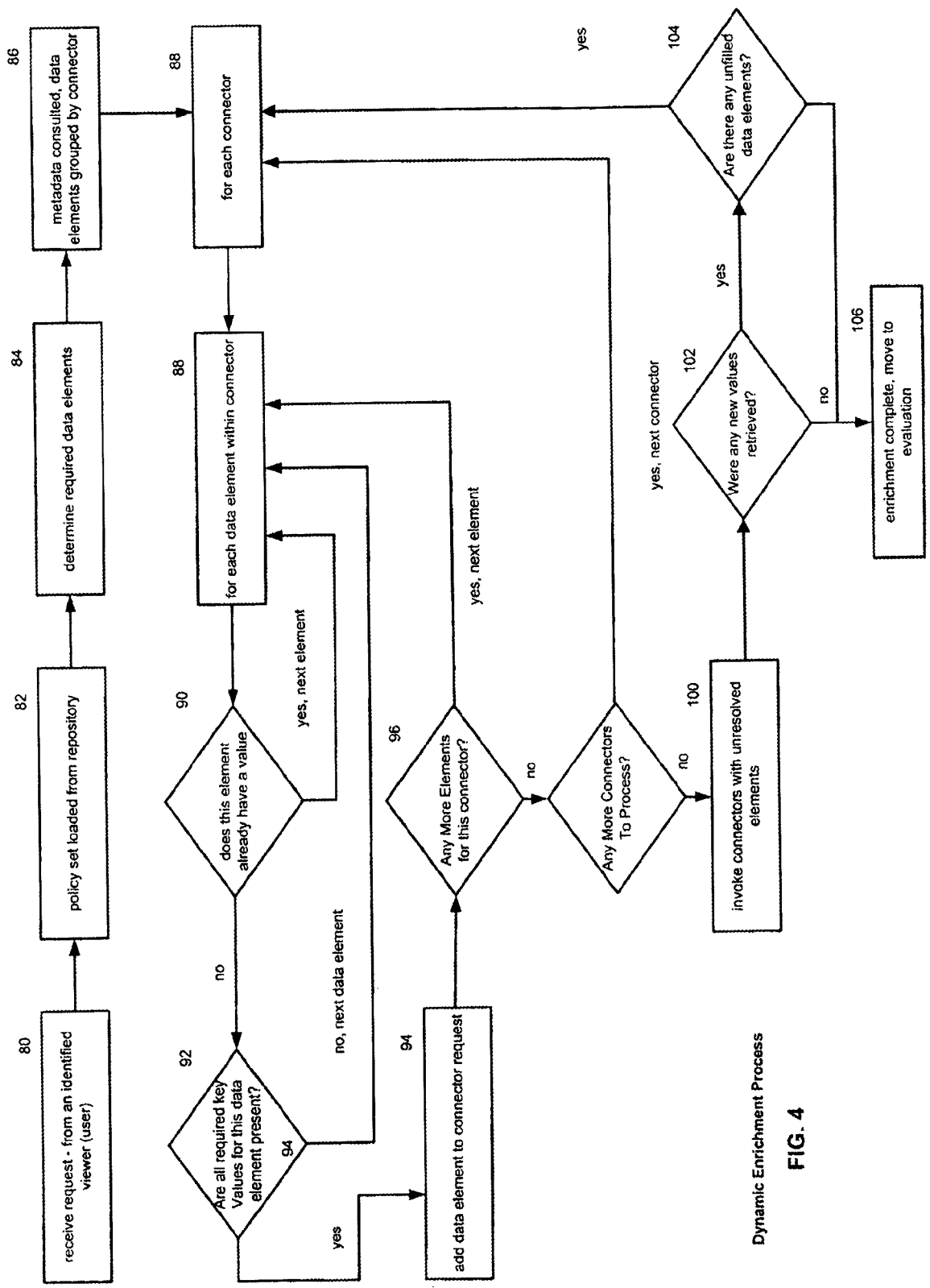
FIG. 4 is a logic flow diagram providing a Dynamic Enrichment Process that depicts utilizing the rules engine to determine whether all of the data elements required to evaluate the rule are available.

The concept of dynamic enrichment of the data is available within the decision context depicted in FIG. 4. The dynamic enrichment process involves receiving a request in step 80. In step 82, in response to the request, a policy set is loaded from repository in step 82. The policy set is analyzed to determine the required data elements in step 84. In step 86, metadata is consulted and data elements are grouped by connector. For each connector a determination is made in step 88 for data for each data element within the connector. This involves determining whether or not each data element already has a value at decision point 90. If it does, an evaluation is made for the next data element. If not, a determination is made a decision point 92 as to whether or not all required key values for this data element are present. If all the required key values for this data element are present the data element is added to the connector request in step 94, otherwise, a determination is made for the next data element. In decision point 96, a determination is made as to whether or not additional data elements are required for this data connector. If additional elements are required the next data element is evaluated returning to step 96. Otherwise, at decision point 98, a determination is made as to whether or not any more connectors remain to be processed. Additional connectors are processed as described above. Otherwise, the connectors with unresolved elements are invoked at step 100 in order to retrieve identified additional data elements. At decision point 102, a determination is made as to whether or not any new values were retrieved. If there were, at decision point 104, a determination is made as to whether any unfilled data elements remain in which case the process is repeated by returning to step 88 until no unfilled data elements remain as indicated at point 106. Essentially, feature allows the rules engine to determine when all the data elements required to evaluate the policy are present. If the answer is no, then the rules engine may, through connectors, map to and retrieve all requisite data elements before evaluating the rule.

Figure 5A:
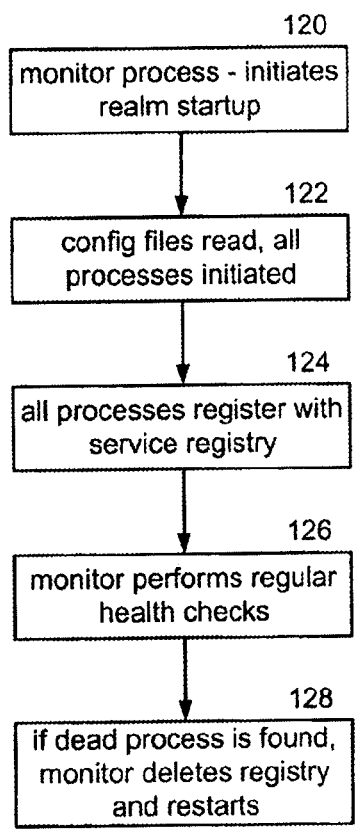
FIGS. 5A and 5B depict a Parallel Fault Tolerant Architecture that enables the invention to dynamically scale effectively across multiple servers and/or platforms while continuously servicing requests from the users/viewers.
Figure 5B:
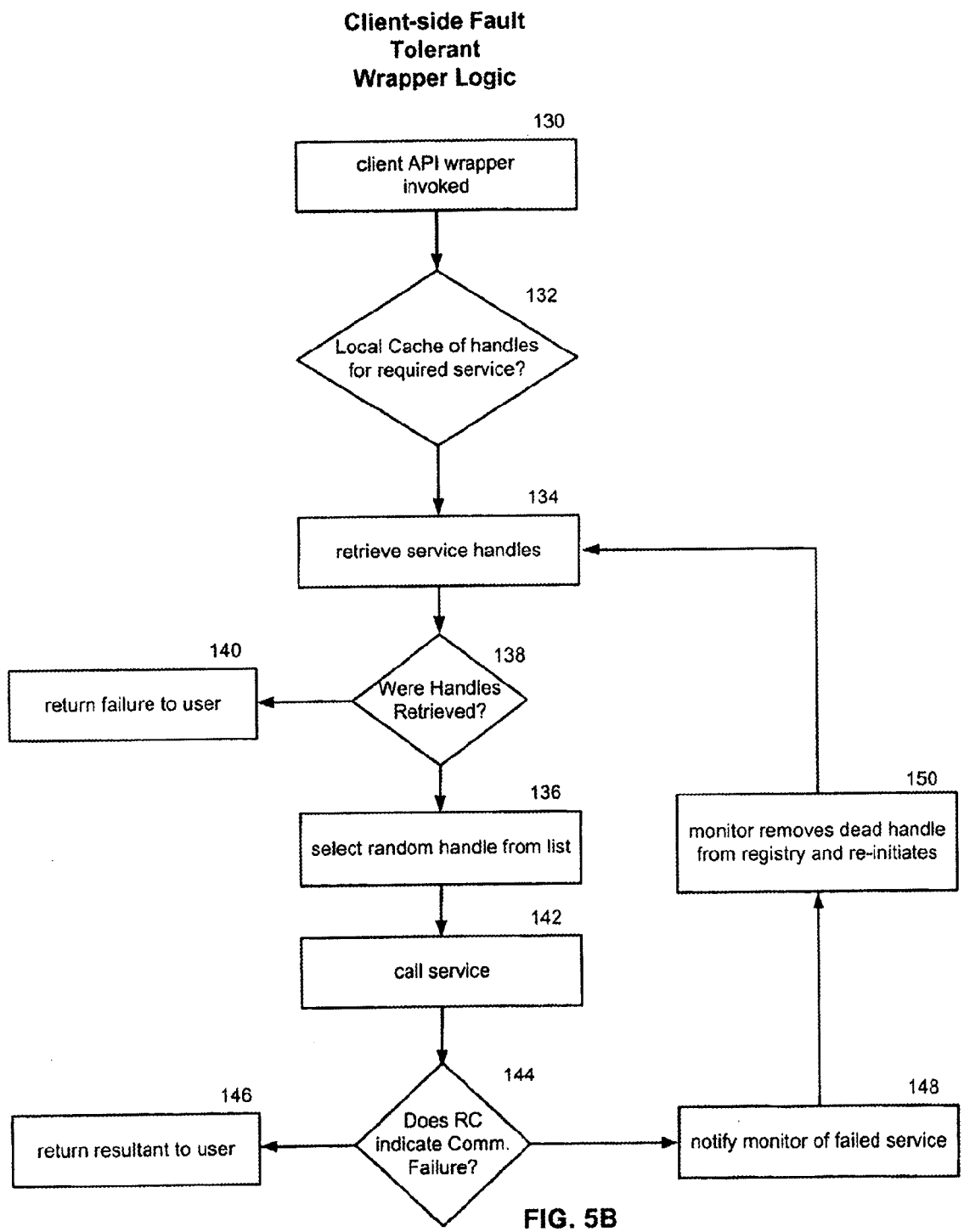

A diverse, fault tolerant architecture that enables effectively scaling across multiple servers and/or platforms while continuously servicing content selection requests is depicted in FIGS. 5A and 5B. This architecture effectively operates even when a multiple server loss occurs.

FIG. 5A depicts the process of realm startup. At step 120, the realm startup process is initiated. In step 122, all of the configuration files are read and associated processes are initiated. These processes are all registered with the service registry in step 124 after which the monitor performs regular health checks at predetermined intervals in step 126. If a dead process is found, the monitor deletes the registry and restarts the process in step 128.

FIG. 5B depicts client side fault tolerant wrapper logic. Here, in step 130 a client API wrapper is invoked. At decision point 132, a determination as to whether or not local cache of handles is required for service. If not required for service, the service handles are retrieved in step 134. Otherwise, a random handle is selected from an available list in step 136. Returning to retrieving service handles, decision point 138 evaluates whether or not handles were retrieved. If they were not, a return failure is made to the user in step 140. Otherwise, we progress to step 136 where the random handles are selected from the list. In step 142, a service call is initiated, after which at decision point 144, a determination is made as to whether or not a communication failure is indicated. If no communication failure is indicated, the resultant is returned to the user in step 146. Otherwise, the monitor is notified of failed service. In step 148, the dead handles are removed from the registry and reinitiating begins in step 150, after which the process returns to step 134.

The current implementation of this concept is built upon a Java infrastructure, and utilizes a number of fairly obscure features of the Java language to facilitate the service. The two most prominent of these are the concept of a dynamic class loader, and HTTP/XML RPC architecture used to manage the interaction between processes.

It is important to note that while one embodiment is implemented in the Java language, the concepts that distinguish the present invention are notably not Java specific, and in no way should the claims be restricted to the Java language or the platforms on which it runs. In a procedural language such as C/C++, PL/1, etc. the same concepts could readily be implemented through the use of dynamically shared libraries or through dynamic overlay methods that are well defined and commonplace.

While the embodiments discussed above focus on serving content to a web server, the present invention may also service other delivery mechanisms such as a Voice Response Unit (VRU), a wireless device such as a pager or cell phone, etc.

Although the present invention is described in detail, it should be understood that various changes, substitutions and alterations can be made hereto without departing from the spirit and scope of the invention as described by the appended claims.

What is claimed is:

1. A centralized system for selecting, from a plurality of advertisements, at least one advertisement for presentation to a user, comprising:
    one or more server-readable criteria repositories comprising at least one criterion associated with at least one advertisement;
    one or more servers operable to:
        receive an advertisement request;
        interface with one or more server-readable data repositories;
        retrieve from the one or more server-readable data repositories information required to evaluate one or more of the criterion;
        evaluate one or more of the criterion to determine advertisements the user is eligible to receive;
        rank a plurality of eligible advertisements by, at least in part, bids associated with the eligible advertisements, wherein at least one of the bids is a static value and at least one of the bids is a value computed by the system.

2. The system of claim 1, wherein the computed bid value is dependent at least in part on at least one characteristic of the user.

3. The system of claim 2, wherein the computed bid value is further dependent on a statistical model.

4. The system of claim 1, wherein at least one of the criteria requires zip code information.

5. The system of claim 1, wherein at least one of the criteria requires information related to a financial index.

6. The system of claim 1, wherein at least a portion of the retrieved information is retrieved from a geospatial information service.

7. The system of claim 1, wherein at least a portion of the retrieved information is retrieved from a credit bureau.

8. The system of claim 1, wherein at least a portion of the retrieved information is retrieved from a market research data supplier.

9. The system of claim 1, wherein at least one a portion of the retrieved information is retrieved from a business partner.

10. The system of claim 1, wherein at least a portion of the retrieved information is retrieved from a demographic data source.

11. The system of claim 1, wherein at least a portion of the retrieved information is retrieved from a usage data source.

12. The system of claim 1, wherein at least a portion of the retrieved information is retrieved from a weather information source.

13. A computer-implemented method comprising:
    receiving an advertisement request comprising a first data describing a user;
    accessing a second data comprising a plurality of advertisements, wherein at least one of the advertisements is associated with at least one corresponding criterion;
    determining if one or more third data values are required for evaluation of at least one of the criterion;
    retrieving any required third data values from at least one data repository;
    determining, by a server, an eligible set of advertisements wherein the determining comprises applying at least one of the criterion to (1) at least a portion of the first data, (2) any retrieved required third data values, or (3) both;

wherein each at least one of the eligible advertisements is associated with a corresponding bid;

ranking a plurality of eligible advertisements by, at least in part, their corresponding bids, wherein at least one of the bids is a static value and wherein at least one of the bids is a value computed by the system;

providing at least one of the ranked advertisements to a requesting system.

14. The method of claim 13, wherein the computed bid value is dependent at least in part on at least one characteristic of the user.

15. The method of claim 14, wherein the computed bid value is further dependent on a statistical model.

16. The method of claim 13, wherein at least one of the criteria requires zip code information.

17. The method of claim 13, wherein at least one of the criteria requires a value related to a financial index.

18. The method of claim 13, wherein at least a portion of the third data values are retrieved from a geospatial information service.

19. The method of claim 13, wherein at least a portion of the third data values are retrieved from a credit bureau.

20. The method of claim 13, wherein at least a portion of the third data values are retrieved from a market research data supplier.

21. The method of claim 13, wherein at least a portion of the third data values are retrieved from a business partner.

22. The method of claim 13, wherein at least a portion of the third data values are retrieved from a demographic data source.

23. The method of claim 13, wherein at least a portion of the third data values are retrieved from a usage data source.

24. The method of claim 13, wherein at least a portion of the third data values are retrieved from a weather information source.

* * * * *